United States Patent
Ugran

(10) Patent No.: US 10,259,369 B2
(45) Date of Patent: Apr. 16, 2019

(54) TRAVEL PILLOW

(71) Applicant: Yvonne Ugran, Aurora, OH (US)

(72) Inventor: Yvonne Ugran, Aurora, OH (US)

( * ) Notice: Subject to any disclaimer, the term of this patent is extended or adjusted under 35 U.S.C. 154(b) by 0 days.

(21) Appl. No.: 15/645,258

(22) Filed: Jul. 10, 2017

(65) Prior Publication Data

US 2018/0009346 A1    Jan. 11, 2018

Related U.S. Application Data

(60) Provisional application No. 62/359,900, filed on Jul. 8, 2016.

(51) Int. Cl.
| | |
|---|---|
| *A47C 20/00* | (2006.01) |
| *B60N 2/882* | (2018.01) |
| *A47G 9/00* | (2006.01) |
| *B64D 11/06* | (2006.01) |
| *A47G 9/10* | (2006.01) |
| *A61H 23/00* | (2006.01) |
| *B60N 2/90* | (2018.01) |
| *A61H 23/02* | (2006.01) |
| *A47C 7/38* | (2006.01) |

(52) U.S. Cl.
CPC .............. *B60N 2/882* (2018.02); *A47C 7/383* (2013.01); *A47G 9/007* (2013.01); *A47G 9/1081* (2013.01); *A61H 23/00* (2013.01); *A61H 23/02* (2013.01); *B60N 2/976* (2018.02); *B64D 11/0642* (2014.12); *A47G 2200/106* (2013.01); *A47G 2200/143* (2013.01); *A61H 2023/002* (2013.01); *A61H 2201/0134* (2013.01); *A61H 2201/0149* (2013.01); *A61H 2201/0157* (2013.01); *A61H 2201/1604* (2013.01); *A61H 2201/1611* (2013.01)

(58) Field of Classification Search
CPC ........... A47C 7/383; A47C 7/386; A47C 7/38; A47C 20/02; A47C 20/025; A47C 20/026; A47C 20/027; B60N 2/882; B60N 2/976; B64D 11/0642; A47G 9/007; A47G 9/1081; A61H 23/00; A61H 2023/002; A61H 2201/0134; A61H 2201/0157
See application file for complete search history.

(56) References Cited

U.S. PATENT DOCUMENTS

| | | | | | |
|---|---|---|---|---|---|
| 145,168 | A | * | 12/1873 | Goge | A61F 11/06 |
| | | | | | 2/209 |
| 1,549,601 | A | * | 8/1925 | Mulgrew | A47C 7/40 |
| | | | | | 5/632 |
| 2,167,178 | A | * | 7/1939 | Kohlstadt | A47K 3/125 |
| | | | | | 297/391 |

(Continued)

FOREIGN PATENT DOCUMENTS

WO    2006115994 A1    2/2006

*Primary Examiner* — Nicholas F Polito
*Assistant Examiner* — Morgan J McClure
(74) *Attorney, Agent, or Firm* — Renner Kenner Greive Bobak Taylor & Weber

(57) ABSTRACT

In one or more embodiments, the present invention provide a versatile travel pillow that provides support to the user's head, neck, and shoulders, prevents the user from sliding sideways with respect to the seat, can be quickly and easily secured to the headrest or armrest of a seat or chair, and can be quickly and easily moved from one vehicle seat to another.

8 Claims, 9 Drawing Sheets

(56) References Cited

U.S. PATENT DOCUMENTS

| | | | | |
|---|---|---|---|---|
| 2,184,996 | A * | 12/1939 | Jacobs | A61F 11/06 2/209 |
| 3,249,949 | A * | 5/1966 | Rosenberg | A61F 11/06 2/209 |
| 3,279,849 | A * | 10/1966 | Radke | A47C 7/425 297/284.5 |
| 3,899,797 | A * | 8/1975 | Gunst | A47C 4/54 297/452.41 |
| 4,440,443 | A | 4/1984 | Nordskog | |
| 4,506,396 | A * | 3/1985 | Ritchie, Jr. | A47C 20/023 5/631 |
| 4,654,898 | A * | 4/1987 | Ishikawa | H04R 1/1008 2/209 |
| 4,669,129 | A * | 6/1987 | Chance | H04R 1/1008 181/129 |
| 4,794,657 | A * | 1/1989 | Avery | A61F 5/01 5/632 |
| 4,850,055 | A * | 7/1989 | Hwang | A61F 11/06 2/209 |
| 4,876,755 | A * | 10/1989 | Parrish | A47C 7/425 297/230.1 |
| 4,904,021 | A | 2/1990 | Clemmer | |
| 4,991,222 | A * | 2/1991 | Nixdorf | H04R 5/023 297/391 |
| 5,269,323 | A * | 12/1993 | Krouskop | A47C 20/021 5/632 |
| 5,313,678 | A * | 5/1994 | Redewill | A47C 21/003 297/393 |
| D353,966 | S * | 1/1995 | Rogers | D24/191 |
| 5,383,711 | A * | 1/1995 | Houghteling | A47D 15/006 297/397 |
| 5,664,271 | A * | 9/1997 | Bellavance | A47C 20/021 5/630 |
| D385,451 | S * | 10/1997 | Pujals, Jr. | D6/596 |
| D387,937 | S * | 12/1997 | Pujals, Jr. | D6/596 |
| D414,367 | S * | 9/1999 | Esseltine | D6/597 |
| D416,427 | S * | 11/1999 | Pecora | D24/211 |
| 5,974,607 | A * | 11/1999 | Smith | A61G 7/072 297/393 |
| 6,023,801 | A * | 2/2000 | Lamm | A47G 9/1009 5/636 |
| 6,123,389 | A * | 9/2000 | O'Connor | A47C 7/383 297/397 |
| 6,182,311 | B1 * | 2/2001 | Buchanan | A47C 20/021 128/845 |
| 6,298,493 | B1 * | 10/2001 | Ambroise | A45D 44/12 128/866 |
| D458,503 | S * | 6/2002 | Norman | D6/601 |
| 6,449,788 | B1 * | 9/2002 | Nichols | A47C 20/021 5/630 |
| 6,625,819 | B1 * | 9/2003 | Tsai | A61F 11/14 181/129 |
| 6,644,747 | B2 * | 11/2003 | Jones | B60N 2/2851 297/397 |
| 6,648,416 | B2 | 11/2003 | O'Connor et al. | |
| 6,938,958 | B2 | 9/2005 | Gold et al. | |
| 7,024,013 | B1 * | 4/2006 | Van Dam | A61F 11/14 2/209 |
| 7,322,061 | B2 | 1/2008 | Carroll | |
| 7,444,687 | B2 * | 11/2008 | Sato | A61F 11/14 128/857 |
| D583,178 | S * | 12/2008 | Blunston | D6/333 |
| 7,587,773 | B2 * | 9/2009 | Littlehorn | A47C 16/00 5/632 |
| 7,685,661 | B2 * | 3/2010 | Popilek | A47G 9/1045 381/301 |
| D623,310 | S * | 9/2010 | Cheng | D24/211 |
| 7,806,472 | B2 * | 10/2010 | Runk | B60N 2/2872 297/219.12 |
| 8,393,027 | B2 * | 3/2013 | Weisberg | A47G 9/109 5/636 |
| 8,434,493 | B1 * | 5/2013 | McGhie | A41D 13/1161 128/200.24 |
| 8,443,467 | B2 * | 5/2013 | Chiang | A61F 11/06 2/209 |
| 9,032,570 | B1 * | 5/2015 | Benami | A47G 9/1009 5/640 |
| D794,814 | S * | 8/2017 | Higgins | D24/211 |
| 9,901,198 | B2 * | 2/2018 | Brouqueyre | A47G 9/1045 |
| 2003/0135927 | A1 * | 7/2003 | Hsia | A47G 9/1009 5/640 |
| 2004/0006822 | A1 * | 1/2004 | Milligan | A47G 9/10 5/636 |
| 2006/0244297 | A1 * | 11/2006 | Demski | A47C 7/38 297/391 |
| 2007/0209115 | A1 * | 9/2007 | Carroll | A47C 7/383 5/636 |
| 2007/0226909 | A1 | 10/2007 | Goldman | |
| 2009/0019641 | A1 | 1/2009 | Ali | |
| 2009/0211032 | A1 | 8/2009 | Lange | |
| 2014/0115788 | A1 | 5/2014 | Shamaiengar | |
| 2015/0272355 | A1 | 10/2015 | Abdo | |
| 2018/0168356 | A1 * | 6/2018 | Porowski | A47G 9/1081 |

* cited by examiner

TRAVEL PILLOW

CROSS REFERENCE TO RELATED APPLICATIONS

This application claims the benefit of U.S. provisional patent application Ser. No. 62/359,900 entitled "Travel Pillow," filed Jul. 8, 2016, and incorporated herein by reference in its entirety.

FIELD OF THE INVENTION

One or more embodiments of the present invention relates to a travel pillow. In certain embodiments, the present invention is directed to a travel pillow and method of securing same to or around a headrest of a seat or chair.

BACKGROUND OF THE INVENTION

With increased travel by car, bus, and/or plane, many people are forced to sit upright for extended periods of time. Trying to sleep or rest in such a position can be very uncomfortable and difficult as there is no support for the head and, unless secured in place, a person's upper body will tend to slide sideways off the seat or into a neighboring passenger. To prevent this, early travel pillows had a substantially horseshoe or semicircular shape to provide support and prevent the head from falling to the side and placing significant strain on the neck. While these neck pillows were somewhat effective in limiting neck strain, they did nothing to prevent the torso from sliding sideways.

To address this issue, travel pillows were developed that could be strapped to the headrest or headrest supports of the seat, preventing the pillow from sliding sideways. These travel pillows, however, have significant drawbacks. In some cases, these securing mechanisms were insufficient to prevent movement or rotation of the travel pillow, preventing it from functioning correctly. In order to prevent this, some of these travel pillow securing systems utilized numerous straps to hold the travel pillow in place. These systems, however, made it very difficult to move the travel pillow from one seat to another or from one vehicle to another.

Accordingly, what is needed in the art is a versatile travel pillow that provides support to the user's head, neck, and shoulders and prevents the user from sliding sideways with respect to the seat, but can be quickly and easily secured to the headrest of a seat or chair or moved from one vehicle seat to another.

SUMMARY OF THE INVENTION

In one or more embodiments, the present invention provide a versatile travel pillow that provides support to the user's head, neck, and shoulders, prevents the user from sliding sideways with respect to the seat, can be quickly and easily secured to the headrest of a seat or chair, and can be quickly and easily moved from one vehicle seat to another. In a first aspect, the present invention is directed to a travel pillow comprising a padded outer portion, a malleable inner member, a first end for attaching said travel pillow to a headrest of a chair or seat, and a second end configured to support the head, neck, or shoulder of a user; wherein said malleable inner member extends into said first end and said first end is configured to be bent around the base or one or more support rods of a head rest of a chair or seat, thereby securing the travel pillow to the headrest of the chair or seat. In one or more embodiments, the second end is larger than said first end.

In one or more embodiments, the travel pillow of the present invention includes any one or more of the above referenced embodiments of the first aspect of the present invention wherein said malleable inner member runs from said first end to said second end. In one or more embodiments, the travel pillow of the present invention includes any one or more of the above referenced embodiments of the first aspect of the present invention wherein the portion of said malleable inner member in said first end is from 2 to 18 inches in length. In one or more embodiments, the travel pillow of the present invention includes any one or more of the above referenced embodiments of the first aspect of the present invention wherein said malleable inner member may be bent in 3 dimensions.

In one or more embodiments, the travel pillow of the present invention includes any one or more of the above referenced embodiments of the first aspect of the present invention wherein said first end has a diameter of from 3/4 inch to 6 inches. In one or more embodiments, the travel pillow of the present invention includes any one or more of the above referenced embodiments of the first aspect of the present invention having a length from about 18 inches to about 48 inches. In one or more embodiments, the travel pillow of the present invention includes any one or more of the above referenced embodiments of the first aspect of the present invention wherein said first end may be wrapped around said second end to form a substantially round or oblong pillow.

In one or more embodiments, the travel pillow of the present invention includes any one or more of the above referenced embodiments of the first aspect of the present invention wherein said second end may be coiled to form a coiled pillow portion. In one or more embodiments, the travel pillow of the present invention includes any one or more of the above referenced embodiments of the first aspect of the present invention further comprising a scent impregnated material.

In a second aspect, the present invention is directed to a bendable travel pillow comprising: a malleable member having a middle portion, a first end, a second end, and a diameter; two removable pillows, each having a pocket, wherein each pocket further comprises an opening having a partial closure, the partial closure opening and closing to change the size of the opening; a first end structure formed at the first end of the malleable member, the first end structure having a diameter larger than the diameter of the malleable member and sized to fit within the pocket of one of the two removable pillows; and a second end structure formed at the second end of the malleable member, the second end structure having a diameter larger than the diameter of the malleable member and sized to fit within the pocket of the other of the two removable pillows; wherein the first end structure and the second end structure are both inserted into the pocket of one of the two removable pillows when the partial closure is in an open position and then moved to a closed position to secure the removable pillows to the first and second ends of the malleable member. In some of these embodiments, the malleable member further comprises an inner malleable member, an inner padded layer, and an outer padded layer.

In one or more embodiments, the travel pillow of the present invention includes any one or more of the above referenced embodiments of the second aspect of the present invention wherein the partial closure is selected from the group consisting of hook and loop closures (Velcro™), zippers, snaps, buttons, laces, snaps, drawstrings, elastic, hooks, and combinations thereof. In one or more embodiments, the travel pillow of the present invention includes any one or more of the above referenced embodiments of the second aspect of the present invention wherein the first and second end structures are formed by bending the first and second ends of said malleable member back on themselves. In some of these embodiments, the travel pillow of the present invention includes any one or more of the above referenced embodiments of the second aspect of the present invention further comprising a scent impregnated material. In one or more embodiments, the travel pillow of the present invention includes any one or more of the above referenced embodiments of the second aspect of the present invention wherein said malleable member may be bent in 3 dimensions.

In a third aspect, the present invention is directed to a method of securing the bendable travel pillow of described above to a headrest of a chair or seat comprising bending said first end around the base or support rods or over the top of a headrest of the chair or seat, thereby securing the pillow to the headrest of the chair or seat.

In a fourth aspect, the present invention is directed to a method of securing the bendable travel pillow described above to an armrest of a chair or seat comprising bending said first end around the armrest of the chair or seat, thereby securing the pillow to the headrest of the chair or seat.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1:
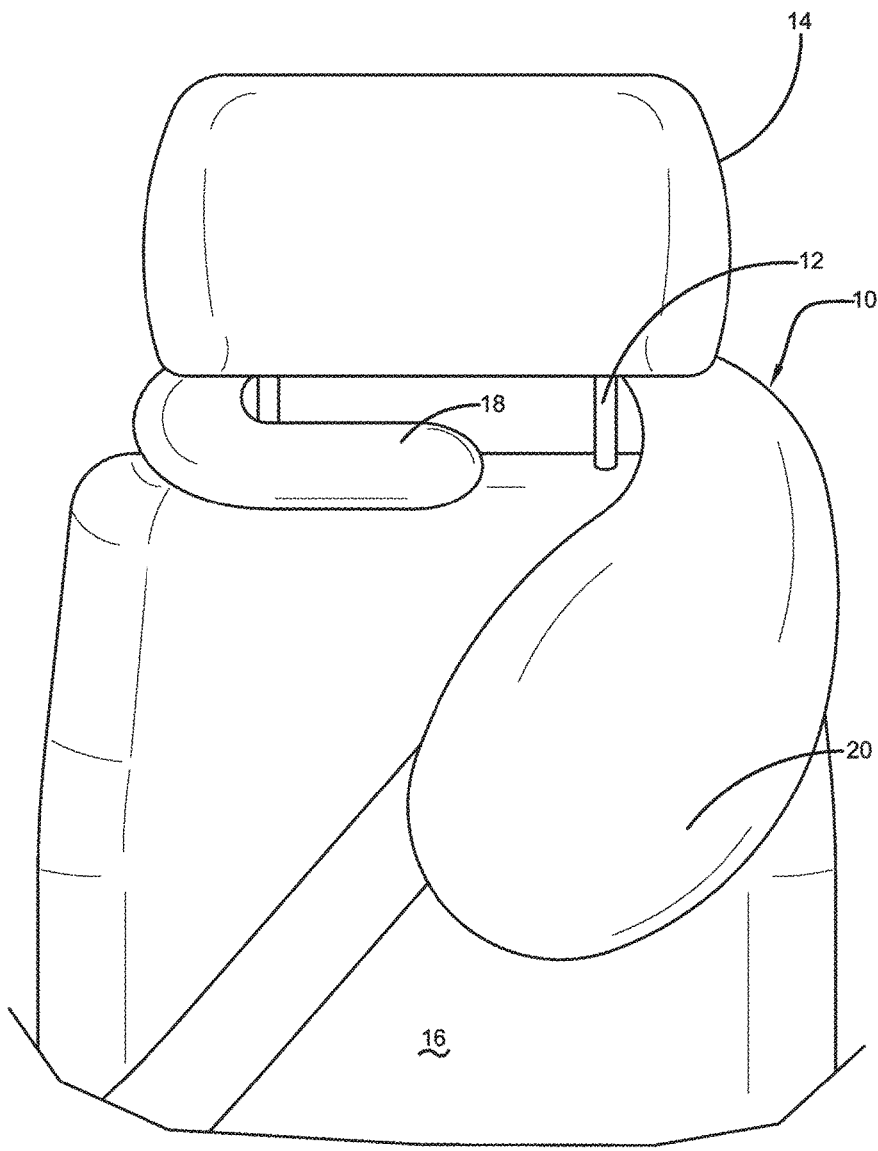
FIG. 1 is a partial front perspective view of a travel pillow according to one or more embodiments of the present invention secured to the headrest of a car seat.
Figure 2:
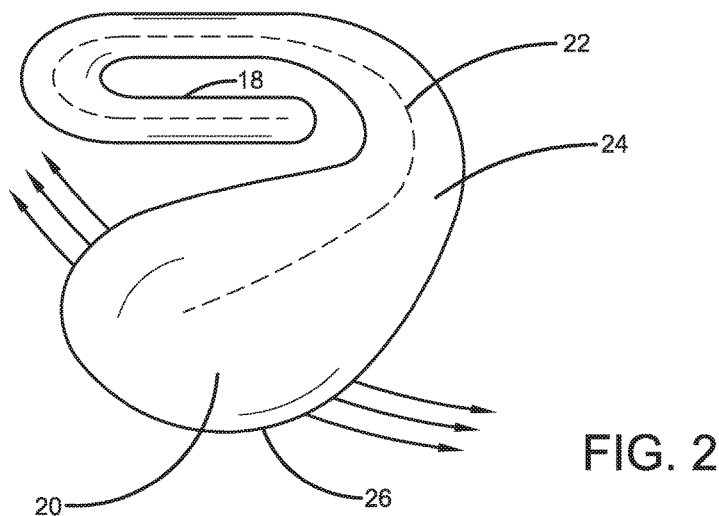
FIG. 2 is a perspective view showing a longitudinal cross section of a travel pillow according to one or more embodiments of the present invention showing the malleable inner member.
Figure 3A:
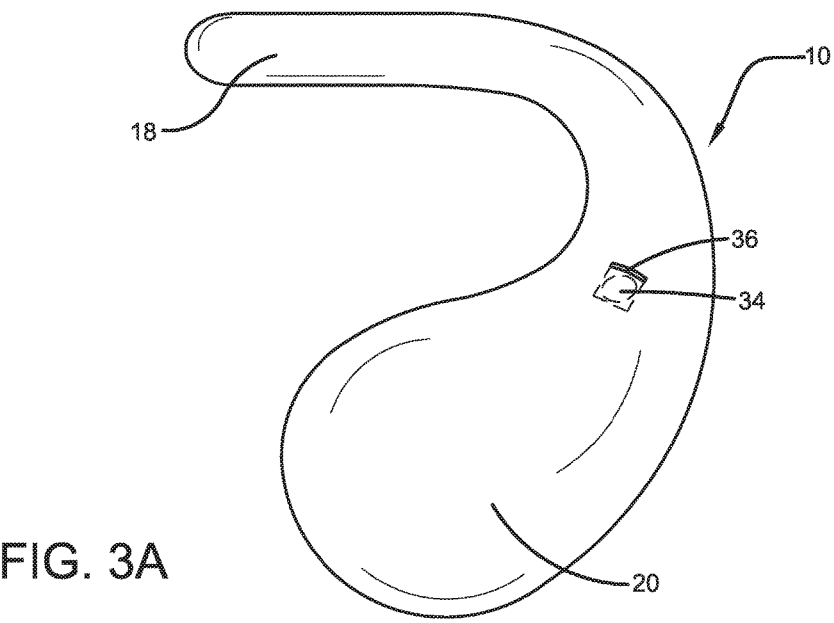
FIG. 3A is a front view of a travel pillow according to one or more embodiments of the present invention having a first end configured to secure the travel pillow to a headrest and a larger second end.
Figure 3B:
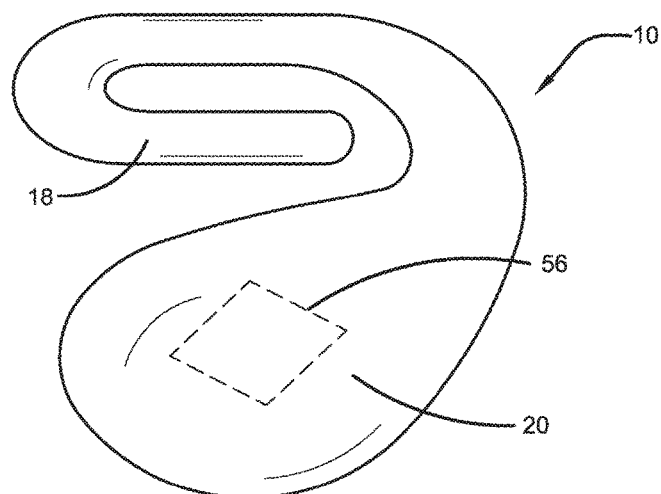
FIG. 3B is a front view of the travel pillow shown in FIG. 3A above having an extended first end to facilitate securing the travel pillow to a headrest as shown above in FIG. 1.

Referring now to FIG. 1, a travel pillow according to one or more embodiments of the present invention, generally indicated by the numeral 10, is shown secured to the support rods 12 of the headrest 14 of car seat 16. Travel pillow 10 includes a first end 18 that is configured to bend around support rods 12 and/or headrest 14, securing travel pillow 10 to seat 16 and a second end 20 that supports the head, neck, or torso of the user. FIG. 2 is a longitudinal cross sectional view of the travel pillow 10 shown in FIG. 1, showing its internal structure.

As can be seen in FIG. 2, travel pillow 10 includes a malleable inner member 22, a padded layer 24, and an outer covering 26. In the embodiment shown in FIG. 2, malleable member 22 has a first end 23 and a second end 25 and runs from the first end 18 to the second end 20 of pillow 10 so that when travel pillow 10 is manually bent more manipulated into a particular configuration, it will retain that configuration. The material used to form malleable member 22 is not particularly limited, provided that the material or structure used will, when manually manipulated into a particular shape or configuration, keep that new configuration. Malleable inner member 22 is preferably flexible in three dimensions.

The amount of force necessary to bend or manipulate malleable inner member 22 is not particularly limited but should be sufficient to enable travel pillow 10 to keep a desired configuration and remain secured to a headrest, without being unduly difficult for an ordinary user to manipulate. In one or more embodiments, malleable inner member 22 may be a segment of metal wire. Suitable wire may include solid or braided metal wire made from a malleable metal such as copper, aluminum, gold, silver, or lead; other ductile metals such as platinum, iron, steel, nickel, tin, manganese, iridium, osmium, tungsten, tantalum, hafnium, rhenium, zirconium erbium, terbium, or samarium; or an alloy thereof. In one or more embodiments, malleable inner member 22 may be a segment of copper wire having a diameter of from 1/16 in or more to 3/8 in or less. In some embodiments, malleable inner member 22 may be a segment of copper wire having a diameter of 1/4 in or less. In some other embodiments, malleable inner member 22 may be a flexible chain of interlocking metal members capable of being bent in three dimensions and, once bent, retaining the new configuration. An example of such an item is shown in published International Application Number WO 2006/115994, the disclosure of which is incorporated herein by reference.

Surrounding malleable inner member 22 is one or more layers of padding material 24. The composition of padding material 24 is not particularly limited and padding material 24 may be made from any material ordinarily used as padding in pillows and cushions of this type. In one or more embodiments, padding material 24 may include, without limitation, foam, down or other feathers, polyester fibers, polyester pellets, Dacron® fibers, Hollofil® fibers, microbeads, memory foam, therapeutic gels, buckwheat husks, millet seeds, flaxseeds, or any combination thereof.

Surrounding and protecting the padding material 24 is outer layer 26. The material used for outer layer 26 is not particularly limited but should be comfortable for the user. Suitable materials may include, without limitation, fleece, cotton, leather, polyester, any other comfortable fabric or fabric like material, or any combination thereof. In one or more embodiments, outer layer 26 may be a soft, fleece-like material. However, travel pillow 10 need not have a single uniform outer surface 26 and in various embodiments the material used for the outer surface 26 covering first end 18 and second end 20 may be different.

In one or more embodiments, one or more areas (not shown) on the portion of outer surface 26 covering first end 18 travel pillow 10 may have a slip resistant material to help secure travel pillow 10 in place. The slip resistant material is not particularly limited and may include any known natural or synthetic, non-toxic, slip resistant material, including without limitation, suitable rubberized or silicone based materials capable of adhering or otherwise being secured to outer surface 26.

Figure 6:
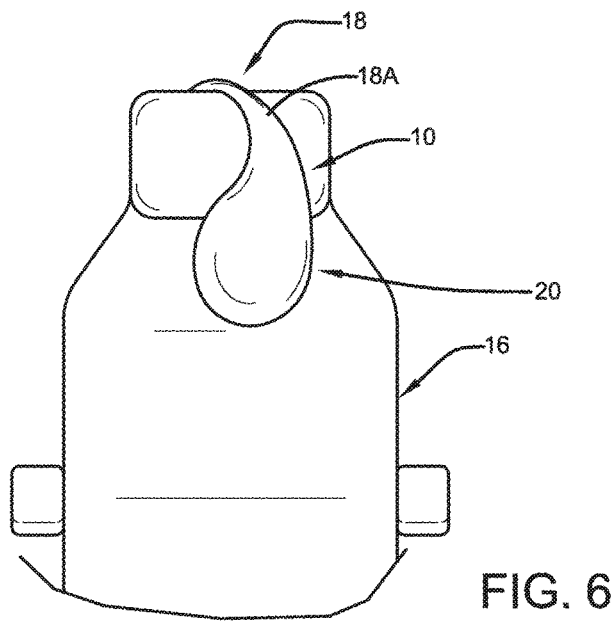
FIG. 6 is a front view of a travel pillow according to one or more embodiments of the present invention secured over the top of a headrest of an airplane seat.
Figure 7:
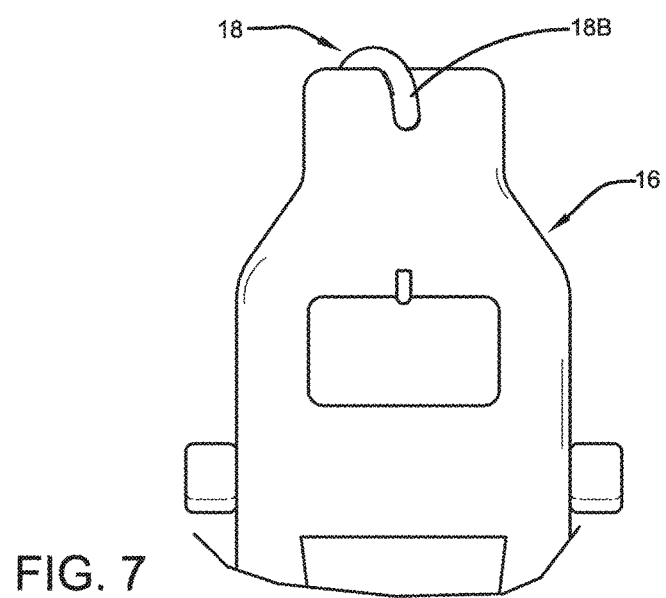
FIG. 7 is a rear view of a travel pillow according to one or more embodiments of the present invention secured over the top of a headrest of an airplane seat.

As set forth above, first end 18 is configured to wrap around the base of a headrest, securing travel pillow 10 to the seat. In the embodiment shown in FIG. 1, headrest 14 may be raised with respect to car seat 16 to expose two support rods 12, but as will be appreciated by those skilled in the art, this is not the only possible arrangement. The present invention may be adapted to work with other headrest-to-car seat configurations. In situations, like the one shown in FIG. 1, where the height of the headrest can be adjusted up and down with respect to the top of the car seat, some type of superstructure, such as support rods 12 or a center post (not shown), will be exposed between the headrest and the car seat. Whatever configuration this particular superstructure may take, the first end 18 of travel pillow 10 may be bent around that super structure to secure the travel pillow 10 to the car seat 16. In some other embodiments where the headrest 14 is fixed to or integral with seat 16, such as an airplane seat, travel pillow 10 may be secured to seat 16 by bending first end 18 around the base of the headrest 14, where it meets the car seat 16 or over the top of the headrest as shown in FIGS. 6 and 7. In embodiments where first end 18 is secured by bending it over the headrest 14 (FIGS. 6 and 7), a portion of first end 18 will be on both the front side (18A) and the back side (18B) of headrest 14. As will be apparent, in these embodiments, the portions of first end 18 on either side of the headrest 18A, 18B are pressed toward each other in a pinching motion, thereby generating the necessary clamping force to keep the travel pillow 10 in place.

Figure 8:
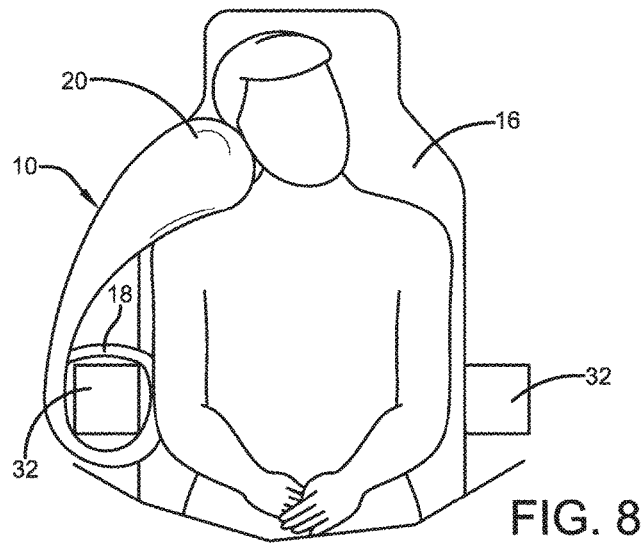
FIG. 8 is a front view of a travel pillow according to one or more embodiments of the present invention secured to the armrest of an airplane seat.
Figure 9:
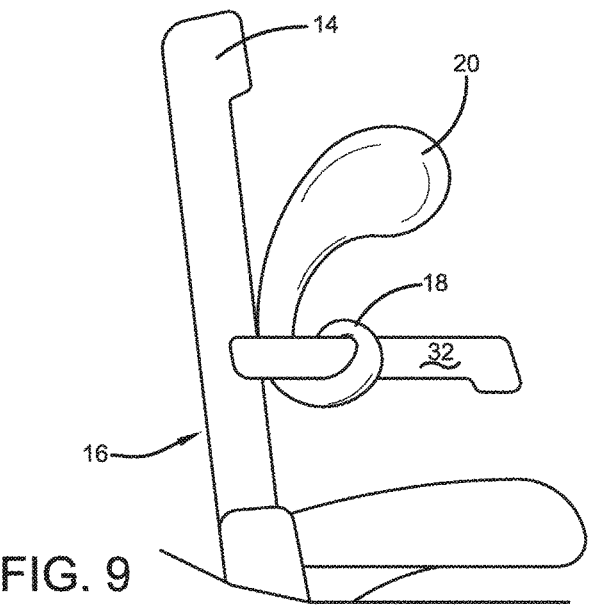
FIG. 9 is a side view of a travel pillow according to one or more embodiments of the present invention secured to the armrest of an airplane seat.

While the travel pillow may be secured to the support rods 12 of a headrest 14 or over the top of a headrest as shown in FIGS. 1, 6 and 7, the invention is not so limited and in various embodiments, the travel pillow of the present invention may be secured to other objects surrounding the user in the same or similar fashion. In some embodiments, for example, the travel pillow may be secured to an arm rest, handle, or seatbelt. In one or more embodiments, the travel pillow of the present invention may be secured to the armrest of an airplane or other similar seat 16 as shown in FIGS. 8 and 9. In the embodiment shown in FIGS. 8 and 9, the first end 18 of travel pillow 10 is wrapped around and the armrest 32 of a chair or seat 16, securing travel pillow 10 to the armrest 32 in a configuration where the second end 20 is available to comfortably contact the head, shoulder or side of the user.

The length of first end 18 is not particularly limited, provided that first end 18 is long enough to wrap around some or all of the support posts 12 or other super structure holding the headrest 14 to the car seat 16 or around the base of the headrest 14 if it is fixed to or integral with car seat 16. In some embodiments, first end 18 is from about 12 inches or more to about 20 inches or fewer in length.

As can be seen in FIGS. 1-4A, because the gap between the bottom of headrest 14 and the top of car seat 16 may not be very large depending upon the height of the user, first end 18 is often significantly thinner than the second end 20, which is intended to support the user in relative comfort. In some embodiments, the diameter of first end 18 may be from about 1 inch or more to about 6 inches or fewer at various places along its length. In some embodiments, the diameter of first end 18 may be 1.5 inches or more, in other embodiments, 2.0 inches or more, in other embodiments, 2.5 inches or more, and in other embodiments, 3.0 inches or more. In some embodiments, the diameter of first end 18 may be 5.5 inches or less, in other embodiments, 5.0 inches or less, in other embodiments, 4.5 inches or less, and in other embodiments, 4.0 inches or less.

As set forth above, second end 20 provides support and cushion comfort to the head, neck, and/or torso of the user. In one or more embodiments, the overall shape of the second end 20 of travel pillow 10 may be as shown in FIGS. 1-3B, but this need not be the case, and other configurations are contemplated and are within the scope of the present invention. Second end 20 may have any shape including, without limitation, round, oblong, oval, and/or cylindrical.

Figure 4A:
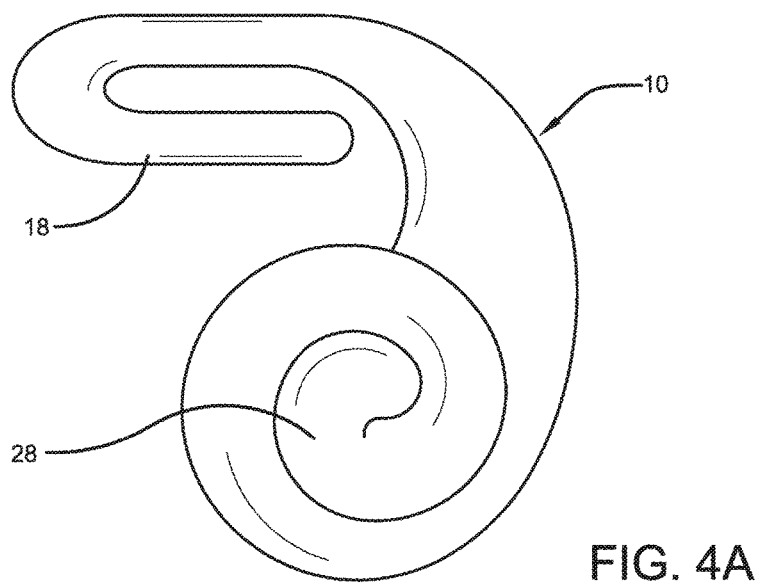
FIG. 4A is a front planer view of a travel pillow according to one or more embodiments of the present invention having a first end configured to secure the travel pillow to a headrest and a larger coiled second end.
Figure 4B:
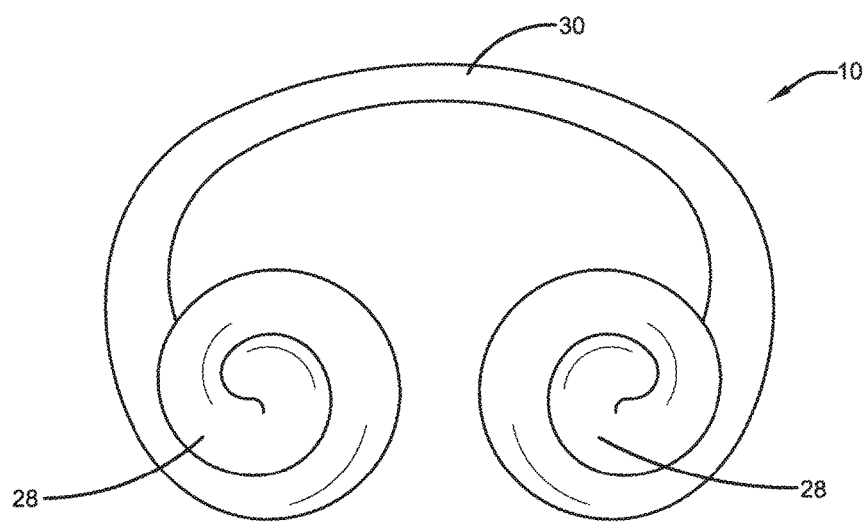
FIG. 4B is a front planer view of a travel pillow according to one or more embodiments of the present invention having two coiled ends and a middle portion that configured to be placed behind a headrest to secure the travel pillow to a seat.

Turning now to the embodiment shown in FIG. 4A, second end 20 may be elongated and then folded back or coiled back on itself to form coiled end 28. In these embodiments, first end 18 may be configured as set forth above and secure the travel pillow 10 to the seat 16, as shown in FIGS. 1, 6-9. In another embodiment shown in FIG. 4B, travel pillow 10 may include two coiled ends 28 separated by middle portion 30. In these embodiments, middle portion 30 is placed behind the headrest 14, thereby securing travel pillow 10 to the headrest 14 of the seat 16. In some of these embodiments, travel pillow 10 may be fabricated in one piece, as shown in FIG. 4B, but in other embodiments, may be formed by joining the first ends 18 of two of the travel pillows 10, such as the one shown in FIG. 4A, to form a travel pillow 10 having the general configuration shown in FIG. 4B.

Figure 5:
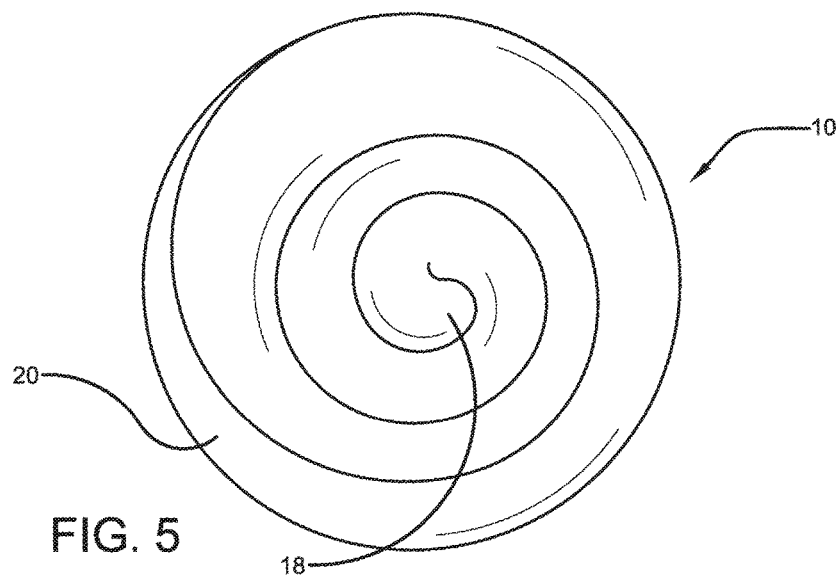
FIG. 5 is a front planer view of a travel pillow according to one or more embodiments of the present invention coiled into a pillow.

In addition, when not being used in conjunction with the headrest of a car seat, travel pillow 10 may, in some embodiments, be coiled or folded back over itself to form a standard pillow, as shown in FIG. 5.

Figure 10:
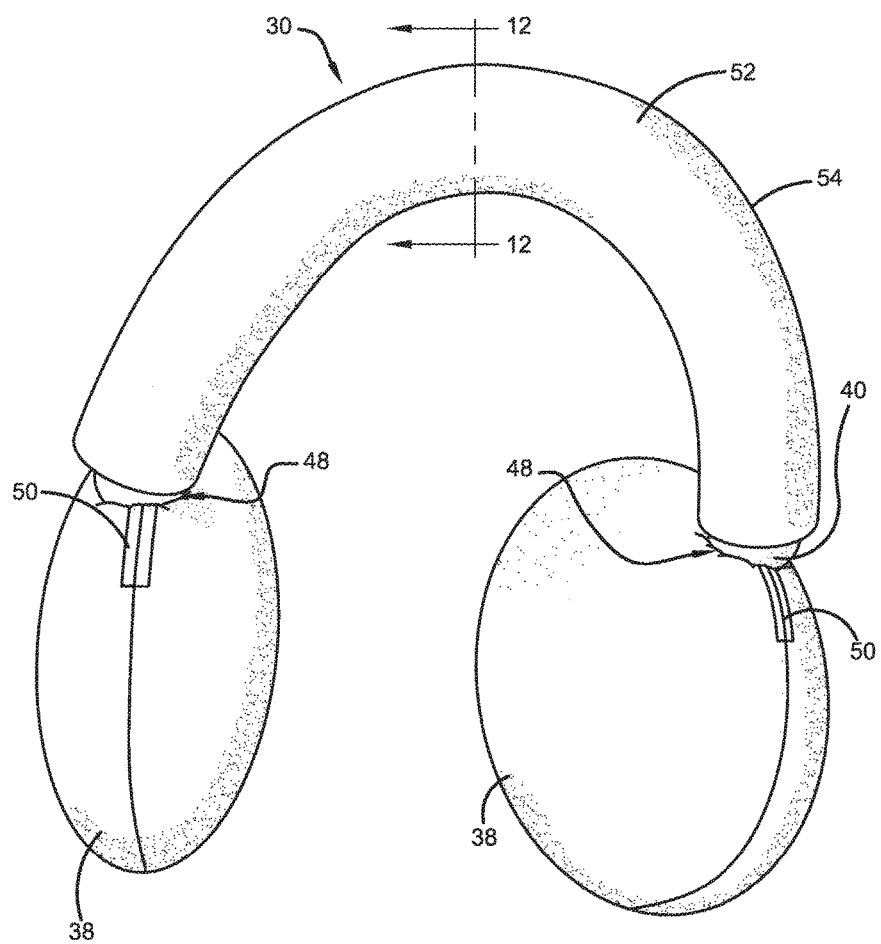
FIG. 10 is a front perspective view of a travel pillow according to one or more embodiments of the present invention.
Figure 11:
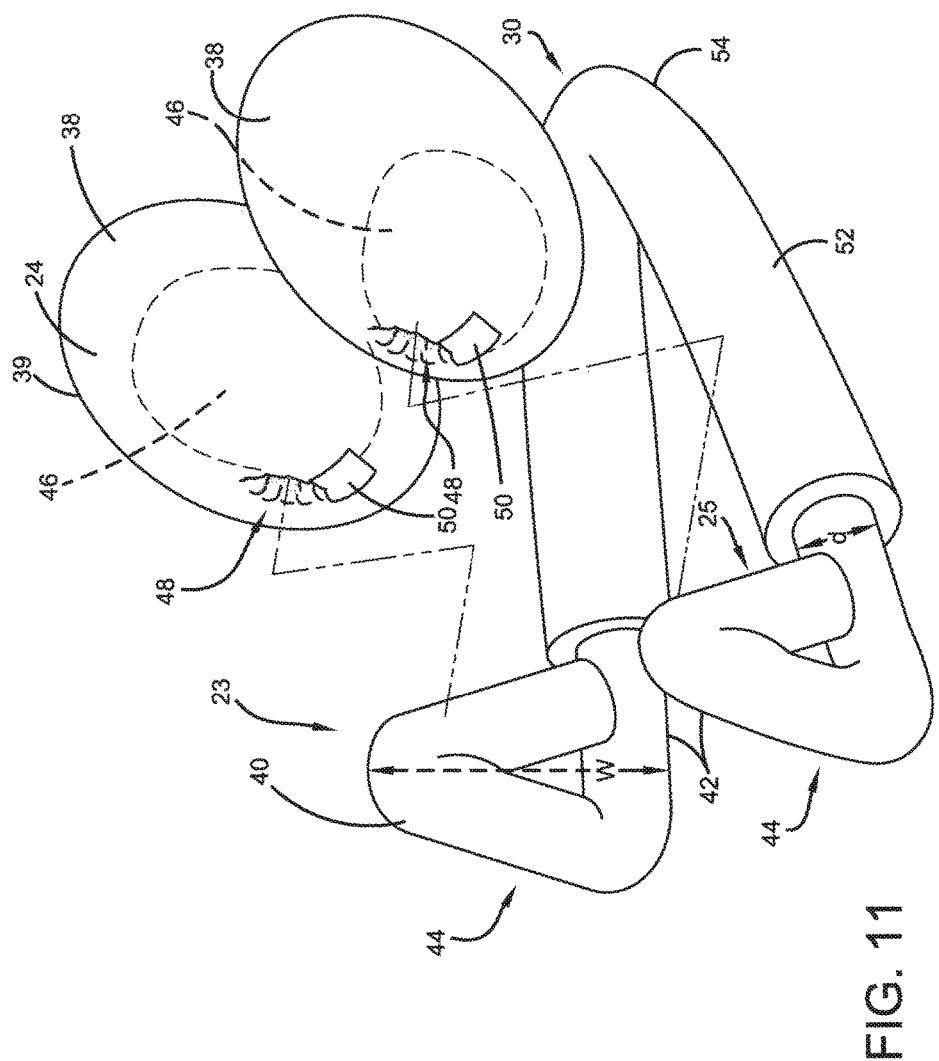
FIG. 11 is an exploded view of a travel pillow according to one or more embodiments of the present invention.
Figure 12:
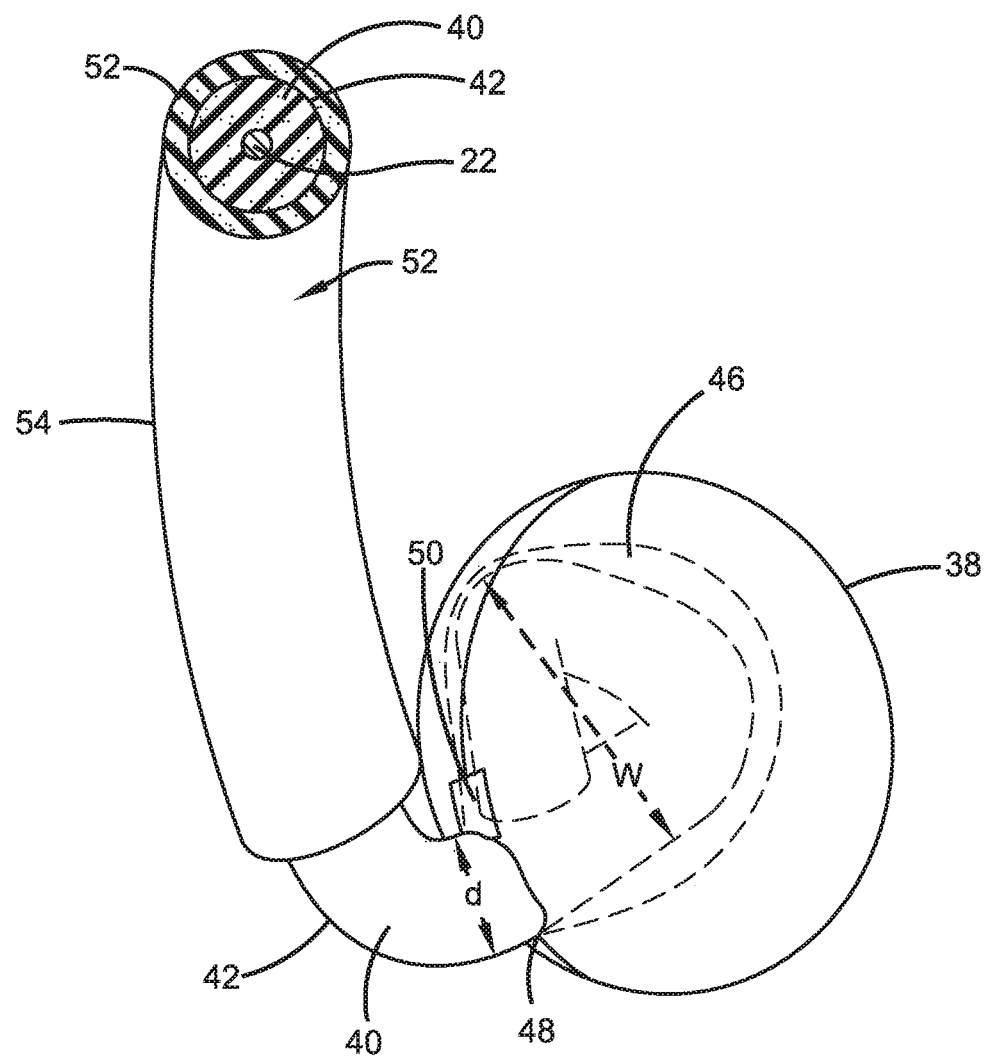
FIG. 12 is a cross sectional view of a travel pillow according to one or more embodiments of the present invention shown in FIG. 10.

In yet another embodiment, the novel travel pillow of the present invention may have the configuration shown in FIGS. 10-12. In this embodiment, like in the embodiment shown in FIG. 4B, middle portion 30 secures the travel pillow around support rods 12 and first and second ends 18, 20 provide support for a pillow or cushion on either side of the passenger's head. As can be seen in FIGS. 10-12, however, the removable cushions 38 on the first and second ends 23, 25 of malleable member 22 are removable for cleaning and/or repair and may be replaced with any other cushion sized to fit over the ends 23, 25 of the malleable member 22. Removable cushions 38 may have any reasonable size and shape, and may be filled with any of the padding materials 24 described above including, without limitation, foam, down or other feathers, polyester fibers, polyester pellets, Dacron® fibers, Hollofil® fibers, microbeads, memory foam, therapeutic gels, buckwheat husks, millet seeds, flaxseeds, or any combination thereof. Similarly, removable cushions 38 will have an outer covering 39, which may be made of any of the materials described above with respect to outer layer 26 and may have any color or design. The overall configuration, shape and color of removable cushions 38 is not particularly limited provided that it can be secured to the first and second ends 23, 25 of malleable member 22, as described below. In one or more embodiments, removable cushions 38 may be shaped to resemble friendly animals or fanciful creatures attractive to children. In some other embodiments, removable cushions 38 may bear the colors and/or logos of popular sports teams and/or colleges.

In these embodiments, malleable member 22 includes and is surrounded by a first padded material 40, which while not particularly limited is preferably a layer of foam rubber or other comparable material, which is both compressible and flexible enough that it does not split, break or crack with the movement of malleable member 22. First padded material 40 is intended to move with malleable member 22 and prevent it from injuring the user.

In various embodiments, first padded material 40 is from about 0.25 inches to about 2 inches thick, as measured radially from malleable member 22 to its outer surface. In some embodiments, first padded material 40 has a thickness of from about 0.25 inches to about 1.5 inches, in other embodiments, from about 0.25 inches to about 1.25 inches, in other embodiments, from about 0.25 inches to 1.0 inches, in other embodiments, from about 0.5 inches to 2.0 inches, in other embodiments, from about 0.75 inches to 2.0 inches, in other embodiments, from about 1.0 inches to 2.0 inches, and in other embodiments, from about 1.25 inches to 2.0 inches, as measured radially from malleable member 22 to its outer surface. In the embodiments, shown in FIGS. 10-12, first padded material 40 has a uniform thickness, but this need not be the case. In some other embodiments, the thickness of the first padded material 40 may vary from place to place along malleable member 22.

In these embodiments, first and second ends 23, 25 are configured to form a larger end structures 44 that are sized to fit with a pocket 46 formed in removable cushions 38 and having a width w at its widest point (maximum width) that is larger than the diameter d of the malleable member 22 (including any integral padding) where it enters cushions 38. (See FIGS. 11 and 12). In some embodiments, end structure 44 is formed by bending first and second ends 18, 20, as shown in FIGS. 11 and 12. In some of these embodiments, end structure 44 is formed by bending first and second ends 18, 20 into a shape where the ends 23, 25 of malleable member 22, which is most often a metal wire, are prevented from injuring the user should they somehow work their way out of first padded material 40. In these embodiments, end structure 44 is preferably formed by bending first and second ends 18, 20 into a triangular shape with the ends 23, 25 of malleable member 22 pointed toward back toward malleable member 22, but the invention is not so limited and other shapes where the end of malleable member 22 pointed toward back toward malleable member 22, such as a square, rectangle, circle, oval, and/or polygon may be used. In some other embodiments, a separate piece (not shown) sized to fit within pocket 46 and having a maximum width that is larger than the diameter of the malleable member 22 (including any integral padding) where it enters cushions 38, may be secured to first and second ends 18, 20.

As can best be seen in FIG. 11, pocket 46 includes an opening 48 that is large enough to allow end structure 44 to pass through. Opening 48 includes a partial closure 50, which reversible closes a portion, but not all of, opening 48. In these embodiments, partial closure 50 is open to allow end structure 44 to fully pass through opening 48 and into pocket 46, and is then closed to prevent end structure 44 to passing back through opening 48, effectively securing the removable cushions 38 to first and second ends 18, 20. In various embodiments, partial closure 50 may be any convention means of reversibly closing a cloth opening including, but not limited to, hook and loop closures (Velcro™), zippers, snaps, buttons, laces, snaps, drawstrings, elastic, or hooks.

In these embodiments, travel pillow 10 shown in FIGS. 10-12 also includes an outer padded material 52 that covers first padded material 40 primarily in the areas of middle portion 30 where it contacts support rods 12. When malleable member 22 is bent around support rods 12, outer padded material 52 interfaces with support rods 12 to hold travel pillow 10 in place. Outer padded material 52 may be formed from any suitable, but is preferably a layer of foam rubber or other comparable material, which is both compressible and flexible enough that it does not split, break or crack with the movement of malleable member 22, and resists sliding over and/or around support rods 12. In some embodiments, outer padded material 52 extends from an area at or near end structure 44 at the first end 18 to an area at or near end structure 44 at the second end 20, but other configurations are possible and within the scope of the invention.

In one or more of these embodiments, outer padded material 52 is from about 0.25 inches to about 2 inches thick, as measured radially from outer surface 42 of first padded material 40 to its outer surface 54. In some embodiments, outer padded material 52 has a thickness of from about 0.25 inches to about 1.5 inches, in other embodiments, from about 0.25 inches to about 1.25 inches, in other embodiments, from about 0.25 inches to 1.0 inches, in other embodiments, from about 0.5 inches to 2.0 inches, in other embodiments, from about 0.75 inches to 2.0 inches, in other embodiments, from about 1.0 inches to 2.0 inches, and in other embodiments, from about 1.25 inches to 2.0 inches, as measured radially from outer surface 42 of first padded material 40 to its outer surface 54. In the embodiments, shown in FIGS. 10-12, outer padded material 52 has a uniform thickness, but this need not be the case. In some other embodiments, the thickness of the outer padded material 52 may vary from place to place along malleable member 22.

Further, various embodiments, travel pillow 10 may contain a scent-impregnated sheet, package, or card 34 to provide the pillow with a pleasant scent. In various embodiments, scent-impregnated sheet, package, or card 34 may be secured to travel pillow 10 in any conventional manner. In some of these embodiments, travel pillow 10 may have a pocket or opening 36 sized to receive a scent producing sheet, package, or card. (See FIG. 3A) This permits the user to select and use a scent producing sheet, package, or card 34 having a particular scent pleasing to them and to replace scent producing sheet, package, or card 34 periodically to keep the scent fresh. In one or more embodiments, the pocket or opening 36 may be located on or near second end 20 or removable cushions 38 of travel pillow 10. In some embodiments, pocket or opening 36 may be within outer layer 26 of second end 20 or removable cushions 38, but in other embodiments, pocket or opening 36 may be secured to the outside of outer layer 26 by any conventional means, including without limitation, adhesives, stitching, hook and loop closures (Velcro™), zippers, snaps, buttons, laces, hooks, or a combination thereof. In one or more embodiments, the scent producing sheet, package, or card may be a small, flat, cardboard card, infused and/or impregnated with a pleasant scent. In some other embodiments, the scent producing sheet, package, or card may be a cloth or nonwoven fabric sheet infused and/or impregnated with a pleasant scent. In still other embodiments, the scent producing sheet, package, or card may be a relatively small cloth or mesh bag containing a scent producing material such as lavender or potpourri.

In one or more embodiments, travel pillow 10 may further comprise a vibration unit 56 that provides a soothing vibration to the user. Vibration unit 56 is not particularly limited and any suitable conventional vibration unit may be used. One of ordinary skill in the art will be able to select a suitable vibration unit 56 without undue experimentation. Vibration unit 56 is preferably battery operated, but the invention is not so limited and embodiments where vibration unit 56 is powered from an external AC or DC power source are within the scope of the invention. Vibration unit 56 may be located anywhere in travel pillow 10, but is preferably located in second end 20 or removable cushions 38.

In light of the foregoing, it should be appreciated that the present invention significantly advances the art by providing a travel pillow and related method that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A bendable travel pillow comprising:
   a malleable member having a middle portion, a first end, a second end, and a diameter;
   two removable pillows, each having a pocket, wherein each pocket further comprises an opening having a partial closure, said partial closure opening and closing to change the size of said opening;
   a first integral polygonal end structure formed at the first end of said malleable member, said first integral polygonal end structure having a maximum width larger than the diameter of said malleable member where it enters one of said two removable pillows and being sized to fit within the pocket of one of said two removable pillows; and
   a second integral polygonal end structure formed at the second end of said malleable member, said second integral polygonal end structure having a maximum width larger than the diameter of said malleable member where it enters one of said two removable pillows and being sized to fit within the pocket of the other of said two removable pillows;
   wherein said first integral polygonal end structure and said second integral polygonal end structure are each inserted into the pocket of one of said two removable pillows when said partial closure is in an open position, and secured therein by moving said partial closure to a closed position, thereby securing said removable pillows to the first and second ends of said malleable member.

2. The bendable travel pillow of claim 1 wherein said malleable member further comprises an inner malleable member, an inner padded layer, and an outer padded layer.

3. The bendable travel pillow of claim 1 said partial closure is selected from the group consisting of hook and loop closures (Velcro™), zippers, snaps, buttons, laces, snaps, drawstrings, elastic, hooks, and combinations thereof.

4. The bendable travel pillow of claim 1 wherein said first and second integral polygonal end structures are formed by bending the first and second ends of said malleable member back on themselves.

5. The bendable travel pillow of claim 1 further comprising a scent impregnated material.

6. The bendable travel pillow of claim 1 wherein said malleable member may be bent in 3 dimensions.

7. The bendable travel pillow of claim 4 wherein said first and second integral polygonal end structures a reformed by bending the first and second ends of said malleable member back on themselves two times so that said first and second integral polygonal end structures are substantially triangular.

8. The bendable travel pillow of claim 1 wherein said malleable member is configured to be bent around the base or support rods of a headrest of a chair or seat, thereby securing the bendable travel pillow to the headrest of the chair or seat.

\* \* \* \* \*